(12) United States Patent
Yadava et al.

(10) Patent No.: US 11,330,415 B2
(45) Date of Patent: May 10, 2022

(54) NEAR FIELD COMMUNICATION DEVICE AND METHOD OF OPERATING THE SAME

(71) Applicant: NXP B.V., Eindhoven (NL)

(72) Inventors: Gulab Chandra Yadava, Bangalore (IN); Junaid K K, Bangalore (IN)

(73) Assignee: NXP B.V., Eindhoven (NL)

( * ) Notice: Subject to any disclaimer, the term of this patent is extended or adjusted under 35 U.S.C. 154(b) by 20 days.

(21) Appl. No.: 16/905,214

(22) Filed: Jun. 18, 2020

(65) Prior Publication Data

US 2021/0006957 A1  Jan. 7, 2021

(30) Foreign Application Priority Data

Jul. 3, 2019  (EP) .................... 19184273

(51) Int. Cl.
*H04W 4/80* (2018.01)
*G06Q 20/32* (2012.01)
*H04B 5/00* (2006.01)

(52) U.S. Cl.
CPC .......... *H04W 4/80* (2018.02); *G06Q 20/3278* (2013.01); *H04B 5/0031* (2013.01)

(58) Field of Classification Search
CPC ... H04W 4/80; G06Q 20/3278; H04B 5/0031; H04B 5/0056
USPC ...................................... 455/41.1
See application file for complete search history.

(56) References Cited

U.S. PATENT DOCUMENTS

| 7,809,012 | B2 | 10/2010 | Ruuska et al. |
| 9,400,888 | B1* | 7/2016 | Banthia ................. H04L 1/188 |
| 2013/0102246 | A1 | 4/2013 | Gagne et al. |
| 2016/0007283 | A1* | 1/2016 | Trainin ............ H04W 52/0216 370/311 |
| 2017/0188262 | A1 | 6/2017 | Roehrle et al. |

FOREIGN PATENT DOCUMENTS

EP  3291156 B1  12/2018

OTHER PUBLICATIONS

Moiz, Salman Abdul et al.; "Concurrency Control in Mobile Environments: Issues & Challenges;" International Journal of Database Management Systems (IJDMS) vol. 3, No. 4, Nov. 2011; DOI:10.5121/ijdms.2011.3411.

(Continued)

*Primary Examiner* — Eugene Yun

(57) ABSTRACT

In accordance with a first aspect of the present disclosure, a near field communication (NFC) device is provided, comprising: an NFC front-end circuit configured to perform a communication with an external device; at least one processing unit configured to process one or more transactions between the NFC device and the external device; an NFC controller configured to control the NFC front-end circuit; wherein the NFC controller is configured to block a current data frame, which is being received by the NFC front-end circuit, if the processing unit has not fully processed a previous data frame. In accordance with a second aspect of the present disclosure, a corresponding method of operating a near field communication (NFC) device is conceived. In accordance with a third aspect of the present disclosure, a corresponding computer program is provided.

19 Claims, 7 Drawing Sheets

(56) References Cited

OTHER PUBLICATIONS

Sony "Development Guidelines for NFC/FeliCa-Enabled Devices;" Version 1.11, No. M830-E01-11; First Edition Jan. 2015, Revision Apr. 2017.
Sony "FeliCa Card Command Sequence Design Guidelines;" Version 1.01, No. M620-E01-01; First Edition Jul. 2010, Revision Apr. 2017.

* cited by examiner

NEAR FIELD COMMUNICATION DEVICE AND METHOD OF OPERATING THE SAME

CROSS-REFERENCE TO RELATED APPLICATIONS

This application claims priority under 35 U.S.C. § 119 to European Patent Application No. 19184273.1, filed on Jul. 3, 2019, the contents of which are incorporated by reference herein.

TECHNICAL FIELD

The present disclosure relates to a near field communication (NFC) device. Furthermore, the present disclosure relates to a corresponding method of operating an NFC device, and to a corresponding computer program.

BACKGROUND

Near field communication (NFC) refers to a set of communication protocols that enable two electronic devices to establish communication by bringing them within proximity of each other. The communication range of NFC is typically in the order of centimeters (e.g., 10 centimeters or less). NFC technology can be used to carry out various transactions, such as transactions for accessing buildings, transactions for accessing public transportation sites or vehicles, and payment transactions. For these purposes, physical NFC-enabled transaction cards are often used. Such transaction cards are often referred to as smart cards. Accordingly, different types of transaction cards exist, such as access cards, transit cards and payment cards. Nowadays, NFC-enabled mobile devices such as smart phones may be used to carry out similar transactions. For this purpose, digital representations of physical transaction cards are typically loaded into the mobile devices. These digital representations may be referred to as emulated cards or embedded cards.

SUMMARY

In accordance with a first aspect of the present disclosure, a near field communication (NFC) device is provided, comprising: an NFC front-end circuit configured to perform a communication with an external device; at least one processing unit configured to process one or more transactions between the NFC device and the external device; an NFC controller configured to control the NFC front-end circuit; wherein the NFC controller is configured to block a current data frame, which is being received by the NFC front-end circuit, if the processing unit has not fully processed a previous data frame.

In an embodiment, the NFC controller is further configured to block a response received from the processing unit if the NFC front-end circuit receives or has received the current data frame.

In an embodiment, the response received from the processing unit is a response to the previous data frame.

In an embodiment, the NFC controller is further configured to accept the current data frame if the processing unit has fully processed the previous data frame.

In an embodiment, a timeout condition of the processing unit triggers that the NFC controller blocks the current data frame.

In an embodiment, processing the transactions between the NFC device and the external device includes processing transactions between a plurality of processing units of the NFC device and said external device, wherein said processing units are coupled to the NFC controller through different interfaces.

In an embodiment, the current data frame includes a command.

In an embodiment, the NFC controller is configured to block the command if the processing unit has not fully processed the previous data frame.

In an embodiment, the processing unit is a secure element.

In an embodiment, the NFC device is a mobile phone or a portable computer, such as a tablet.

In an embodiment, the transactions include payment transactions and/or transit transactions.

In accordance with a second aspect of the present disclosure, a method of operating a near field communication (NFC) device is conceived, comprising: an NFC front-end circuit performs a communication with an external device; at least one processing unit processes one or more transactions between the NFC device and the external device; an NFC controller controls the NFC front-end circuit; wherein the NFC controller blocks a current data frame, which is being received by the NFC front-end circuit, if the processing unit has not fully processed a previous data frame.

In accordance with a third aspect of the present disclosure, a computer program is provided, comprising computer-executable instructions which, when executed, carry out or control a method of the kind set forth.

In an embodiment, a non-transitory computer-readable medium comprises a computer program of the kind set forth.

DESCRIPTION OF DRAWINGS

Embodiments will be described in more detail with reference to the appended drawings, in which.

DESCRIPTION OF EMBODIMENTS

Near field communication (NFC) refers to a set of communication protocols that enable two electronic devices to establish communication by bringing them within proximity of each other. The communication range of NFC is typically in the order of centimeters (e.g., 10 centimeters or less). NFC technology can be used to carry out various transactions, such as transactions for accessing buildings, transactions for accessing public transportation sites or vehicles, and payment transactions. For these purposes, physical NFC-enabled transaction cards are often used. Such transaction cards are often referred to as smart cards. Accordingly, different types of transaction cards exist, such as access cards, transit cards and payment cards. Nowadays, NFC-enabled mobile devices such as smart phones may be used to carry out similar transactions. For this purpose, digital representations of physical transaction cards are typically loaded into the mobile devices. These digital representations may be referred to as emulated cards or embedded cards.

Near field communication infrastructures are often designed and built for transaction sequences based on physical smart cards, in which fast transactions can be carried out between terminals and single physical smart cards. For this purpose, the terminals include an NFC reader. Transaction failures do not often occur, because the communication between an NFC reader and a single physical smart card is mostly reliable. However, NFC-enabled mobile devices may contain a plurality of emulated cards, and a processing unit which contains and executes those cards (e.g, a secure element) typically needs more time to process data received from a reader. It is noted that a secure element (SE) may be a tamper-resistant integrated circuit with installed or pre-installed smart-card-grade applications, for instance payment applications, which have a prescribed functionality and a prescribed level of security. Furthermore, a secure element may implement security functions, such as cryptographic functions and authentication functions. In addition, NFC-enabled mobile devices may contain further processing units, such as embedded universal integrated circuit cards (eUICCs), for initiating and performing additional functions and transactions of the NFC-enabled device, and/or a plurality of logical interfaces for supporting different types of functions and transactions. The increased complexity of such an NFC system may lead to transaction failures. This, in turn, has a negative impact on the user experience, because the user may have to reinitiate a transaction multiple times.

Figure 1A:
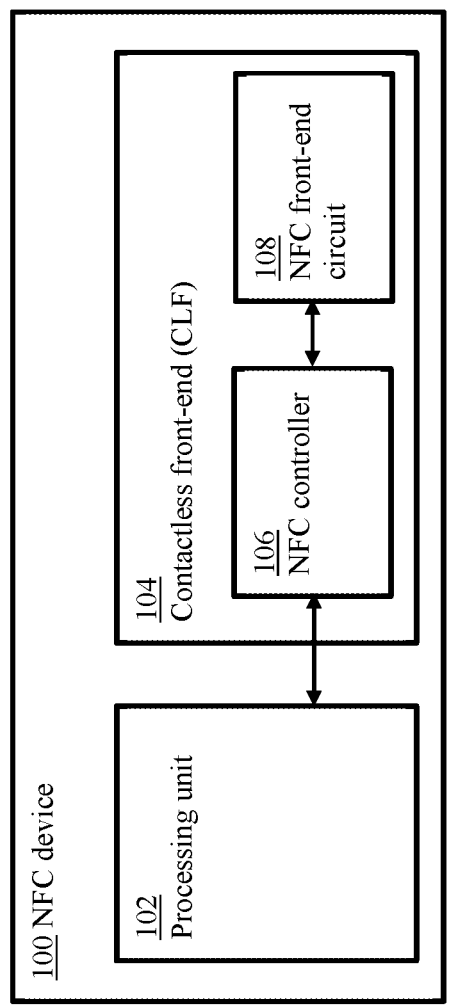
FIG. 1A shows an illustrative embodiment of an NFC device.

FIG. 1A shows an illustrative embodiment of an NFC device 100. The NFC device 100 comprises a contactless front-end 104 and a processing unit 102. The contactless front-end 104 comprises an NFC controller 106 and an NFC front-end circuit 108. In accordance with the present disclosure, the NFC front-end circuit 108 is configured to perform a communication with an external device (not shown). Furthermore, the processing unit is configured to process one or more transactions between the NFC device 100 and the external device. Furthermore, the NFC controller 106 is configured to control the NFC front-end circuit, wherein the NFC controller is configured to block a current data frame, which is being received by the NFC front-end circuit 108, if the processing unit 102 has not fully processed a previous data frame. In this way, it can be avoided that the processing unit receives another frame to process, before a response to the previous frame has been generated. Thus, the risk of a transaction failure is reduced.

It is noted that blocking of the current data frame may be done by refraining from forwarding the current data frame to the processing unit. In other words, the current data frame may be dropped by the NFC controller. Furthermore, the data frame may be removed from the internal buffer of the NFC controller, for example.

Figure 1B:
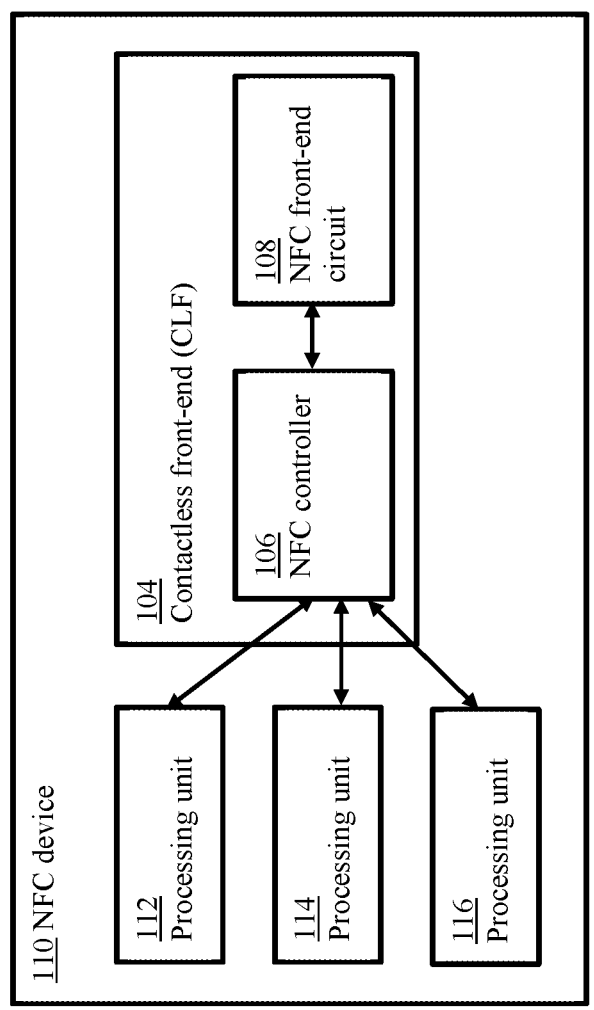
FIG. 1B shows another illustrative embodiment an NFC device.
Figure 1C:
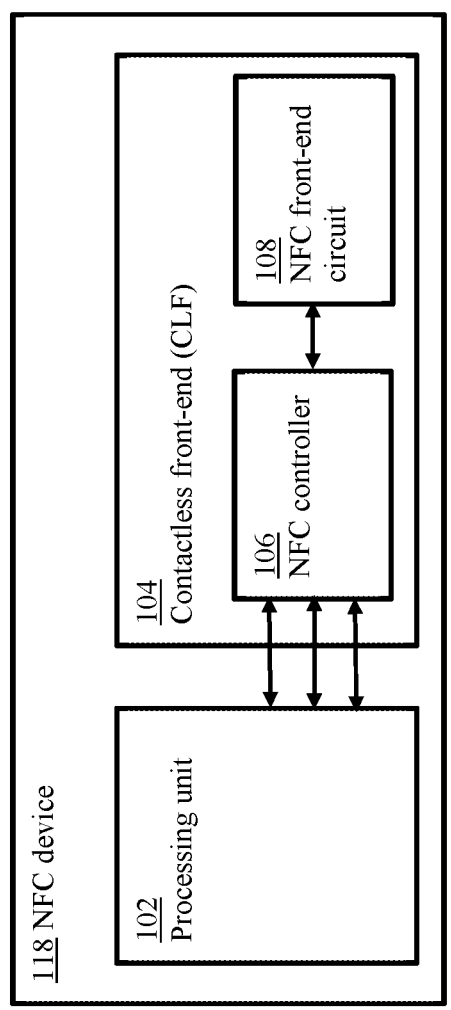
FIG. 1C shows a further illustrative embodiment of an NFC device.

Furthermore, it is noted that the processing of the previous data frame may be delayed for various reasons, for example because the processing unit 102 is performing concurrent tasks. Furthermore, as shown in FIG. 1B, the processing of the previous data frame may be delayed because the response generated by the corresponding processing unit may not be received in time by the NFC controller 106, due to the fact that other processing units are communicating with the NFC controller 106 through their respective interfaces. In other words, the processing of the previous data frame may be delayed due to concurrent accesses to the NFC controller 106 by different processing units. Alternatively, or in addition, a single processing unit may have different logical interfaces to the NFC controller (as shown in FIG. 1C), which may also cause delays due to concurrent accesses to the NFC controller through said different logical interfaces.

In an embodiment, the NFC controller 106 is further configured to block a response received from the processing unit 102 if the NFC front-end circuit 108 receives or has received the current data frame. In this way, it can be prevented that the reader receives a wrong response. More specifically, since the reader may expect a response to the current data frame instead of the previous data frame, the delayed response to the previous data frame may be the wrong response. By blocking this response, this can be prevented. Thus, the risk of a transaction failure is further reduced. Again, said blocking may be realized by dropping the response and removing it from an internal buffer, for example.

In an embodiment, the NFC controller 106 is further configured to accept the current data frame is the processing unit 102 has fully processed the previous data frame. In other words, if the processing unit 102 has fully processed the previous data frame, the current data frame may be forwarded to the processing unit 102 for further processing. In this way, unnecessary delays in the processing of transactions can be avoided. In an embodiment, a timeout condition of the processing unit 102 triggers that the NFC controller 106 blocks the current data frame. This results in a practical and effective implementation.

FIG. 1B shows another illustrative embodiment of an NFC device 110. In this embodiment, processing the transactions between the NFC device 110 and the external device includes processing transactions between a plurality of processing units 112, 114, 116 of the NFC device and said external device, wherein said processing units 112, 114, 116 are coupled to the NFC controller 106 through different interfaces. In such a system, blocking a current data frame if one or more of the processing units 112, 114, 116 have not fully processed a previous data frame may be particularly advantageous. More specifically, in such a system, different processing units 112, 114, 116—such as an embedded secure element (eSE) and an embedded universal integrated circuit card (eUICC)—may execute different transactions with an external device. The NFC controller 106 is configured to block data frames if one or more of the processing units have not fully processed a previous data frame, so that they will not reach the processing units responsible for carrying out the transactions. The different processing units may be coupled to the NFC controller through distinct interfaces, such as a serial peripheral interface (SPI) and a single wire protocol (SWP) interface.

FIG. 1C shows a further illustrative embodiment of an NFC device 118. In this embodiment, the processing unit 102 has different logical interfaces to the NFC controller 106. The NFC controller 102 is configured to block a current data frame if the processing unit 102 has not fully processed a previous data frame. As mentioned above, this may be advantageous in case of concurrent accesses to the NFC controller through the different logical interfaces.

In an embodiment, the current data frame includes a command. Commands typically require a response from the processing unit. Thus, by blocking a command, it can be prevented that the processing unit 102 is triggered to generate another response, while it is processing previously received data. In a practical and effective implementation, the NFC controller 106 is configured to block the command if the processing unit 102 has not fully processed the previous data frame.

Figure 2:
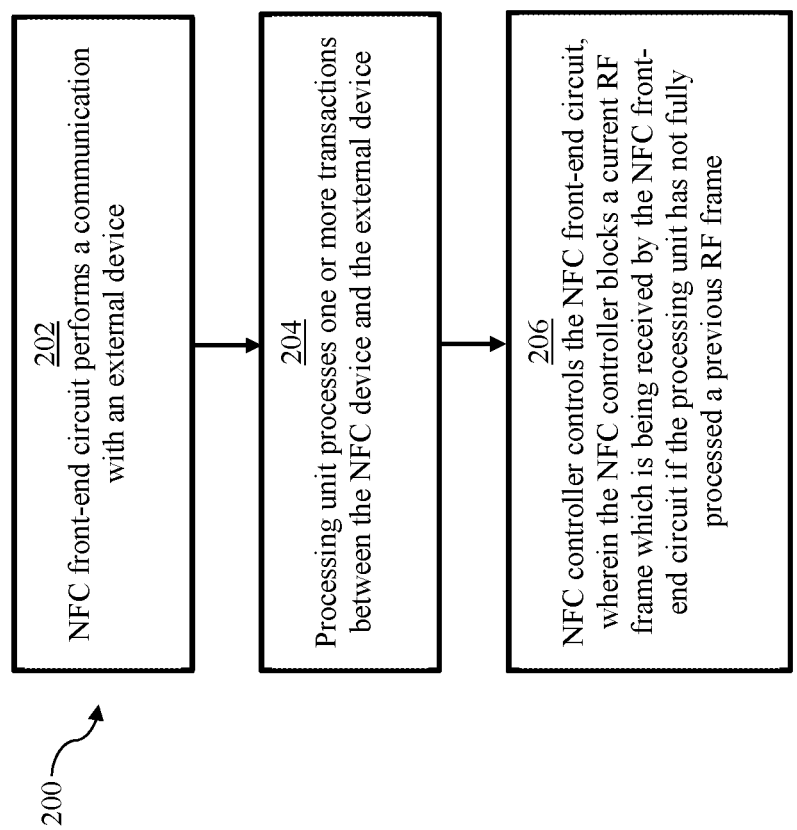
FIG. 2 shows an illustrative embodiment of a method of operating an NFC device.

FIG. 2 shows an illustrative embodiment of a method 200 of operating an NFC device. The method 200 comprises the following steps. At 202, the NFC front-end circuit performs a communication with an external device. At 204, the processing unit processes one or more transactions between the NFC device and the external device. Furthermore, at 206, the NFC controller controls the NFC front-end circuit, wherein the NFC controller blocks a current data frame which is being received by the NFC front-end circuit if the processing unit has not fully processed a previous data frame. In this way, it can be avoided that the processing unit receives another frame to process, before a response to the previous frame has been generated. Thus, the risk of a transaction failure is reduced.

Figure 3:
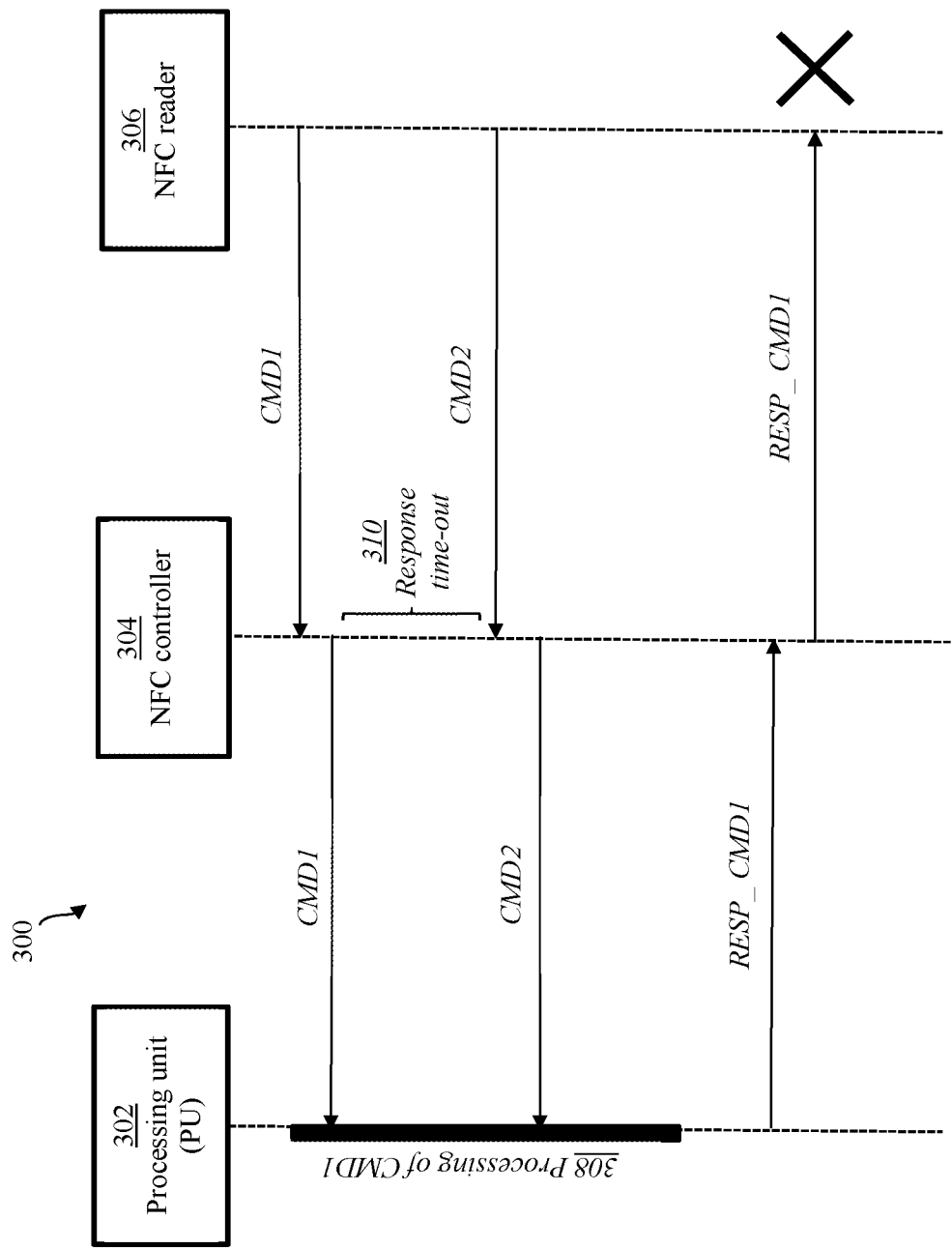
FIG. 3 shows an example of a communication diagram.

FIG. 3 shows an example of a communication diagram 300. In particular, FIG. 3 shows an example of a typical communication between a processing unit 302, an NFC controller 304 and an external NFC reader 306. In the situation shown in FIG. 3, the NFC reader 306 transmits a first command CMD1 to the NFC controller 304, through the NFC front-end circuit (not shown). Then, the NFC controller 304 forwards the first command CMD1 to the processing unit 302. The processing unit 302 starts processing the first command CMD1, which takes an amount of time shown as block 308 in FIG. 3. However, the amount of time 308 exceeds a response time-out 310, i.e. an amount of time within which the NFC controller 304 expects a response to the first command CMD1. In the meantime, the NFC reader 306 transmits a second command CMD2 to the NFC controller 304, again through the NFC front-end circuit. Since the time-out has already elapsed, the NFC controller 304 transmits also this second command CMD2 to the processing unit 302, while the first command CMD1 is still being processed. Subsequently, the processing unit 302 returns a response RESP_CMD1 back to the NFC controller 304. Then, the NFC controller 304 transmits the response RESP_CMD1 to the NFC reader 306. However, since the NFC reader 306 had already transmitted a second command CMD2, the response RESP_CMD1—which is a response to the first command CMD1—may not be the response expected by the NFC reader 306. Thus, a transaction failure may occur.

Figure 4:
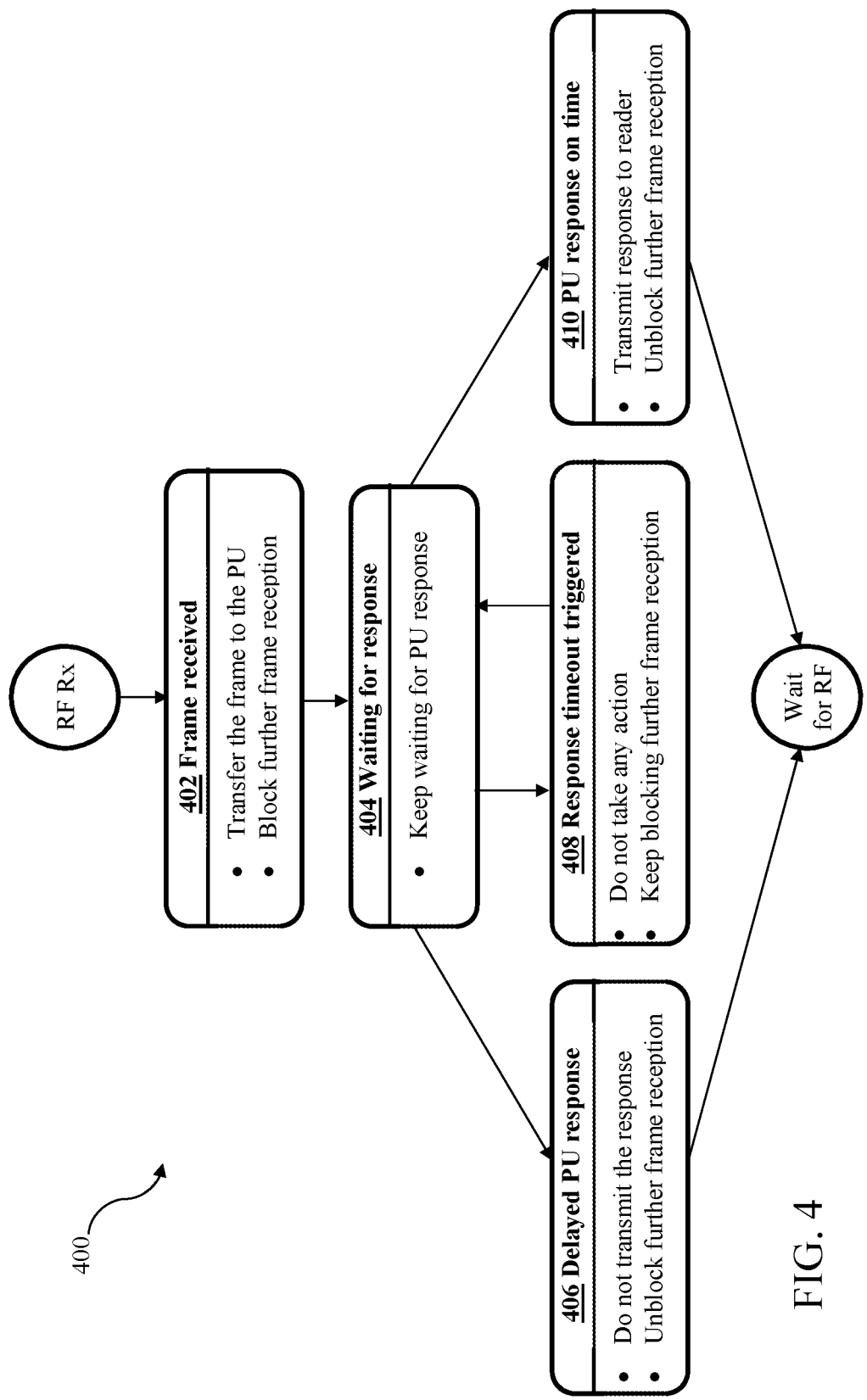
FIG. 4 shows an illustrative embodiment of a state diagram.

FIG. 4 shows an illustrative embodiment of a state diagram 400. In this embodiment, the NFC controller may enter the state "Frame received" 402 if it receives an data frame. In this state, it transfers the frame to the processing unit, and it blocks any further frames transmitted by the NFC reader. Subsequently, the NFC controller enters the state "Waiting for response" 404. In this state, the NFC controller waits for a response from the processing unit. If a time-out has elapsed without a response from the processing unit, the NFC controller enters the state "Response timeout triggered" 408. In this state, the NFC controller does not take any further action and it keeps blocking further frame reception. The NFC controller may also return to the state "Waiting for response" 404. If the NFC controller receives a delayed response from the processing unit, it enters the state "Delayed PU response" 406. In this state, it does not transmit the response to the NFC reader, and it unblocks further frame reception. However, if the NFC controller receives a response from the NFC controller on time, then it transmits said response to the NFC reader, and it unblocks further frame reception (i.e., it forwards newly received frames to the processing unit again). In this way, the risk of transaction failures is reduced.

Figure 5:
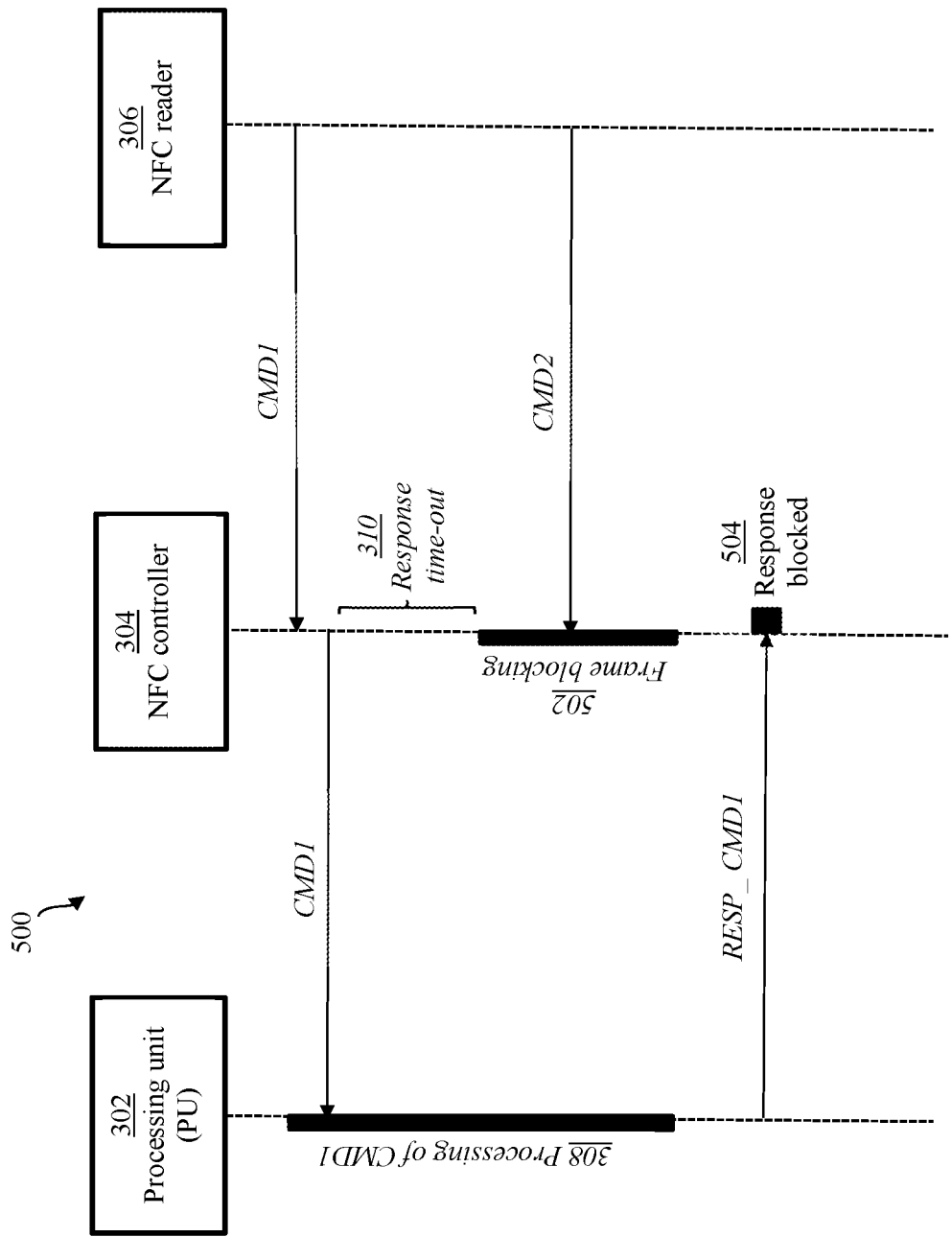
FIG. 5 shows an illustrative embodiment of a communication diagram.

FIG. 5 shows an illustrative embodiment of a communication diagram 500. In particular, FIG. 5 shows an example of a communication between a processing unit 302, an NFC controller 304 and an external NFC reader 306, in which frames transmitted by the NFC reader 306 are blocked 502 by the NFC controller 304 if a response time-out 310 has elapsed without having received a response to a first command CMD1 from the processing unit 302. Thus, a second command CMD2 transmitted by the NFC reader 306 is not forwarded to the processing unit 302. Furthermore, the delayed response RESP_CMD1 to the first command CMD1, which is transmitted from the processing unit 302 to the NFC controller 304 after the time-out has elapsed, is not transmitted to the NFC reader 306. Thus, the response is effectively blocked 504. In this way, the risk of transaction failures is further reduced.

The systems and methods described herein may at least partially be embodied by a computer program—i.e., a software application or "application" in short—or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

In general, the term "interface" may refer to a connection between electronic components or logical units. In computing, an interface may be defined as a shared boundary across which two or more separate components of a computer system exchange information. The exchange can be between software, computer hardware, peripheral devices, humans, and combinations of these. As used herein, an interface may refer to a physical interface, e.g. a physical connection between a processing unit and an NFC controller, and/or to a logical interface, e.g. one out of multiple interface protocols defined for a physical connection between a processing unit and an NFC controller.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS

100 NFC device
102 processing unit
104 contactless front-end
106 NFC controller
108 NFC front-end circuit
110 NFC device
112 processing unit
114 processing unit
116 processing unit
118 NFC device
200 method of operating an NFC device
202 NFC front-end circuit performs a communication with an external device
204 processing unit processes one or more transactions between the NFC device and the external device
206 NFC controller controls the NFC front-end circuit, wherein the NFC controller blocks a current data frame which is being received by the NFC front-end circuit if the processing unit has not fully processed a previous data frame
300 communication diagram
302 processing unit
304 NFC controller
306 NFC reader
308 processing of CMD1
310 response time-out
400 state diagram
402 frame received
404 waiting for response
406 delayed PU response
408 response timeout triggered
410 PU response on time
500 communication diagram
502 frame blocking
504 response blocked

The invention claimed is:

1. A near field communication, NFC, device, comprising:
an NFC front-end circuit configured to perform a communication with an external device;
at least one processing unit configured to process one or more transactions between the NFC device and the external device;
an NFC controller configured to control the NFC front-end circuit;
wherein the NFC controller is configured to block a current data frame from being provided to the at least one processing unit that is being received by the NFC front-end circuit, if the processing unit has not fully processed a previous data frame within a response timeout period and unblocks further frame reception received from the external device in response to the NFC controller receiving a delayed response from the processing unit.

2. The NFC device of claim 1, wherein the NFC controller is further configured to block a response received from the processing unit if the NFC front-end circuit receives or has received the current data frame.

3. The NFC device of claim 2, wherein the response received from the processing unit is a response to the previous data frame.

4. The NFC device of claim 1, wherein the NFC controller is further configured to accept the current data frame if the processing unit has fully processed the previous data frame.

5. The NFC device of claim 1, wherein a timeout condition of the processing unit triggers that the NFC controller blocks the current data frame.

6. The NFC device of claim 1, wherein processing the transactions between the NFC device and the external device includes processing transactions between a plurality of processing units of the NFC device and said external device, wherein said processing units are coupled to the NFC controller through different interfaces.

7. The NFC device of claim 1, wherein the current data frame includes a command.

8. The NFC device of claim 7, wherein the NFC controller is configured to block the command if the processing unit has not fully processed the previous data frame.

9. The NFC device of claim 1, wherein the processing unit is a secure element.

10. The NFC device of claim 1, wherein the NFC device is part of a mobile phone or a portable computer, such as a tablet.

11. The NFC device of claim 1, wherein the transactions include payment transactions and/or transit transactions.

12. A method of operating a near field communication, NFC, device, comprising:
   an NFC front-end circuit performs a communication with an external device;
   at least one processing unit processes one or more transactions between the NFC device and the external device;
   an NFC controller controls the NFC front-end circuit;
   wherein the NFC controller blocks a current data frame from being provided to the at least one processing unit that is being received by the NFC front-end circuit, if the processing unit has not fully processed a previous data frame within a response timeout period and unblocks further frame reception received from the external device in response to the NFC controller receiving a delayed response from the processing unit.

13. The method of claim 12, wherein the NFC controller blocks a response received from the processing unit if the NFC front-end circuit receives or has received the current data frame.

14. The method of claim 13, wherein the response received from the processing unit is a response to the previous data frame.

15. The method of claim 12, wherein the NFC controller accepts the current data frame if the processing unit has fully processed the previous data frame.

16. The method of claim 12, wherein a timeout condition of the processing unit triggers that the NFC controller blocks the current data frame.

17. The method of claim 12, wherein processing the transactions between the NFC device and the external device includes processing transactions between a plurality of processing units of the NFC device and said external device, wherein said processing units are coupled to the NFC controller through different interfaces.

18. The method of claim 12, wherein the current data frame includes a command.

19. The method of claim 12, wherein the method is implemented as a computer program comprising computer-executable instructions stored in a computer-readable non-transitory medium, the instructions, when executed, carry out or control the method.

* * * * *